Patented Oct. 27, 1925.

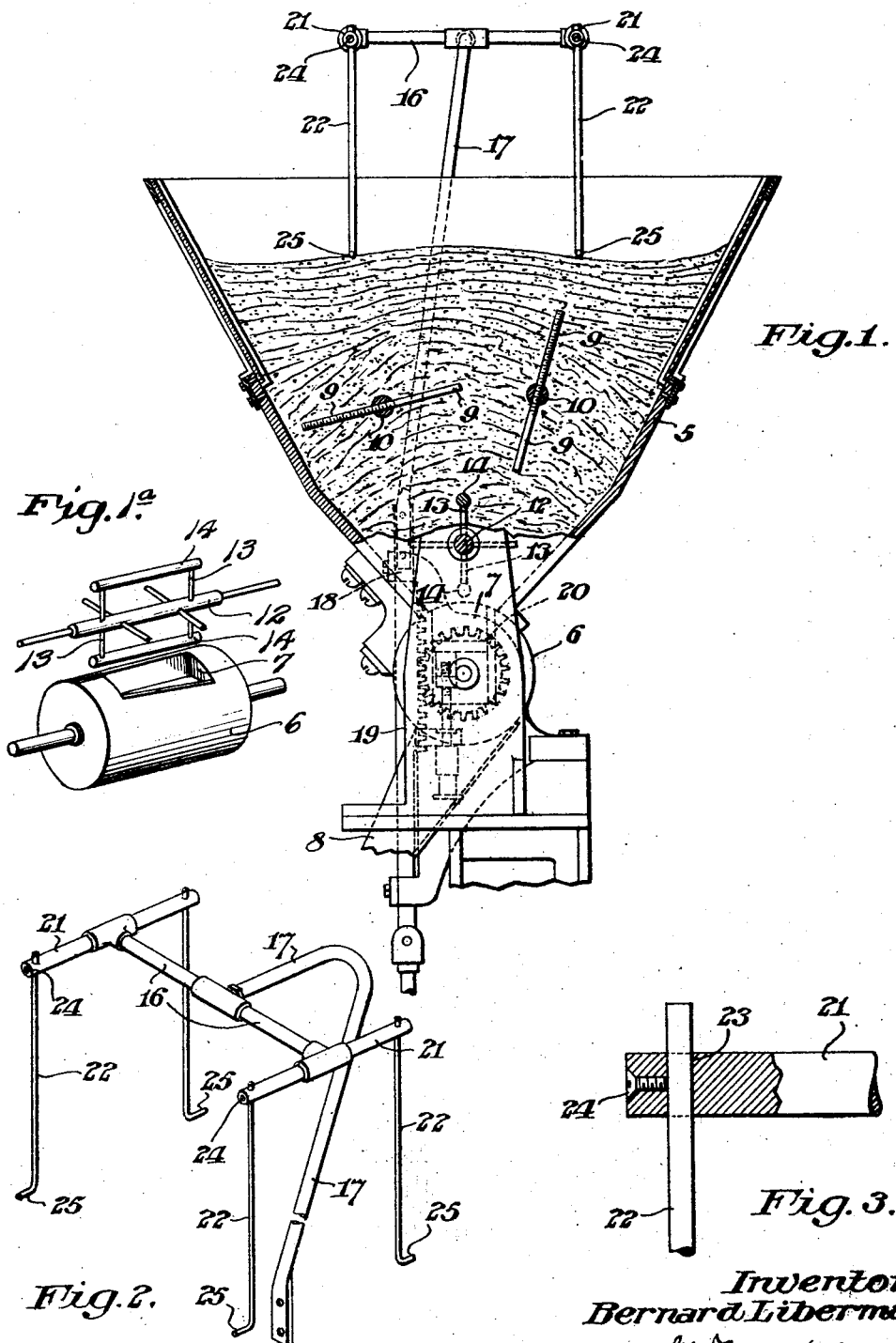

1,559,266

UNITED STATES PATENT OFFICE.

BERNARD LIBERMAN, OF PHILADELPHIA, PENNSYLVANIA.

CIGAR BUNCHING.

Application filed April 8, 1922. Serial No. 550,666.

*To all whom it may concern:*

Be it known that I, BERNARD LIBERMAN, a citizen of the United States, residing at Philadelphia, in the county of Philadelphia, State of Pennsylvania, have invented a new and useful Method and Means for Cigar Bunching, of which the following is a specification.

My invention relates to improvements in cigar bunching. The object is to provide an improvement in the method and means for delivering measured charges of filler to a suitable bunching device, such as the bunching apron. The special object of the present invention is to facilitate the regular and constant delivery of scrap to the pocket of the measuring device, and to prevent the mass of scrap in the supply holder or hopper from bridging or otherwise failing to flow with regularity and in even density toward said measuring pocket.

Referring to the drawings, which illustrate merely by way of example suitable means for effecting my invention:

Fig. 1 is a vertical cross-section of a hopper and associated mechanism including my said improvement.

Fig. 1ª is a perspective view of the measuring pocket and the agitator.

Fig. 2 is a view in perspective of my improved structure.

Fig. 3 is a fragmentary detail in part section on an enlarged scale.

Similar numerals refer to similar parts throughout the several views.

The hopper 5 is adapted to contain a supply of scrap tobacco, which supply is replenished from time to time as required. At the base of the hopper is the measuring device 6 provided with the pocket 7. This device has a rotative reciprocative movement from the receiving position as shown in Fig. 1, with the pocket 7 opening into the hopper for receiving the scrap tobacco therefrom, to the discharging position in which the measured charge of scrap is delivered from the pocket 7 into the trough 8.

The rotative operation of the measuring device 6 is by a pinion and rack bar, connected with other operative parts of the machine.

In order that the scrap may flow regularly from the hopper to the pocket 7, I have provided the stirrers, comprising the fingers or rods 9 extending from the rotating shafts 10. Said shafts being connected with other rotating parts of the machine and are adapted to rotate relatively thereto. The shafts 10 and fingers 9 are positioned about midway the top and bottom of hopper 5. In addition to this, I have provided the rotating shaft 12 having the radially extending rods or arms 13 carrying the rods 14 extending parallel with shaft 12. This shaft 12 which is also connected with other operating parts of the machine, is preferably mounted just over pocket 7, when said pocket is in the receiving position, as in Fig. 1, and so that the parallel rods 14 will extend over the pocket 7 and in close proximity thereto, as shaft 12 rotates. The purpose of this device is further to agitate the scrap and work the same toward and into the pocket 7.

These several devices usually work satisfactorily under certain conditions. There are however, certain other conditions, for example, when the scrap is quite moist, or the atmosphere where the machine is working is moist, or for other reasons the particles of scrap have a tendency to adhere or stick more or less together, it sometimes happens that the mass of scrap above the agitators 9 and 10, forms or tends to form a bridge and does not fall or flow evenly at all times toward the pocket 7. It therefore becomes at times desirable to press downwardly and agitate the upper portions of the mass of scrap, or otherwise break the bridge and assure the constant downward movement of the scrap. This of course may be arbitrarily done from time to time by the operator, but his failure to attend to this at the required times may readily result in uneven flow, uneven feed, and hence uneven bunches and defective cigars. I have found that this operation may be accomplished automatically with great precision and efficiency by means of the following mechanism. The frame 16 is connected to and supported by the arm or bracket 17. This bracket 17, which has a certain amount of resilience, is secured to the upper end of the rack-bar 18 supported by and operating in the housing 19. This rack bar 18 meshes with pinion 20, in operative relationship with the measuring element 6. This rack bar 18 has a vertical reciprocation with each rotative oscillation of the measuring device 6 moving upwardly as the pocket 7 moves to the receiving position, and downwardly as the pocket 7 moves to the discharging position. Consequently the frame 16 has a correspondingly up and down movement. The arm or bracket is so proportioned and disposed as to support the frame 16 over the middle part of hopper 5 as shown in Fig. 1.

To the outer end of each parallel extension 21 of frame 16 is secured the vertically extending rod 22 passing through the channel 23 in the extension 21 and secured in position of adjustment by the set-screw 24 as shown in Fig. 3. These rods 22 are preferably four in number, extend vertically and are therefore all parallel to each other as shown in Fig. 2. The lower end of each rod 22 is preferably bent at right angles to the vertical extension so that each rod shall have a short horizontal extension 25 at its lower extremity, also as shown in Fig. 2.

In operation: The shafts 10 provided with the agitating fingers 9, are adapted to rotate in opposite directions during the operation of the machine. This tends to keep the mass of scrap agitated and broken up in the middle part of the mass of scrap. The rotation of the shaft 12 tends to keep the mass of scrap agitated and broken up in the lower part of the hopper and also, to a certain extent, to press the scrap into the measuring pocket 7.

The vertical rods 22 with the short horizontal extensions 25, move upwardly with each clockwise movement of element 6, and downwardly with each counterclockwise movement of element 6, so that there is an up and down movement of rods 22, to each discharge of pocket 7. The rod or bracket 17 which supports the frame 16 is comparatively light in weight and resilient, and is somewhat reduced in cross-section adjacent its point of connection with rod 18. The result is that the up and down reciprocating actuation of bracket 17 causes it to vibrate, giving a corresponding vibration to the rods 22. These rods 22 and horizontal extensions 25 moving up and down and at the same time vibrating in the upper regions of the mass of scrap in the hopper, keep the same thoroughly agitated and broken up, thereby effectually preventing the formation of arches or bridges in the mass of scrap tobacco and insuring its constant, regular, and even flow toward the measuring pocket 7.

What I claim is:—

1. The method of delivering measured charges of scrap tobacco, which consists in agitating by oppositely directed rotative movements the middle portion of a supply mass of said scrap, and exerting pressure upon the charge throughout its length, also by a rotative movement.

2. The method of delivering measured charges of scrap tobacco, which consists in agitating by oppositely directed rotative movements the middle portion of a supply mass of said scrap, and exerting pressure upon the charge throughout its length, also by a rotative movement, and simultaneously agitating the upper portion of said supply mass, above the location of the first mentioned rotative movements to prevent bridging.

3. In a scrap bunching machine, the combination of a measuring element, a supply hopper for delivering scrap thereto, rotating agitators positioned near the middle part of the hopper, and a rotating agitator near the discharge of the hopper having horizontal rods, operating to press the charge into the measuring element.

4. In a scrap bunching machine, the combination of a measuring element, a supply hopper for delivering scrap thereto, rotating agitators positioned near the middle part of the hopper, a rotating agitator near the discharge of the hopper having horizontal rods operating to press the charge into the measuring element, and vertically moving agitators operating upon the mass of scrap above the rotating agitators, in order to prevent the formation of arches by said agitators.

5. In a scrap bunching machine, the combination of a measuring element, a supply hopper for delivering scrap thereto, rotating agitators positioned near the middle part of the hopper, a rotating agitator near the discharge of the hopper having horizontal rods operating to press the charge into the measuring element, and vertically moving agitators operating upon the mass of scrap above the rotating agitators, in order to prevent the formation of arches by said rotating agitators, said vertically reciprocating agitators provided with a resilient support adapted to vibrate in its reciprocating movements.

BERNARD LIBERMAN.